US008909745B2

(12) United States Patent
Bender et al.

(10) Patent No.: US 8,909,745 B2
(45) Date of Patent: *Dec. 9, 2014

(54) RE-PROGRAMMING PROGRAMMABLE HARDWARE DEVICES WITHOUT SYSTEM DOWNTIME

(75) Inventors: Carl A. Bender, Highland, NY (US); Nihad Hadzic, Wappingers Falls, NY (US); Jeffrey C. Hanscom, Poughkeepsie, NY (US); Howard M. Haynie, Wappingers Falls, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/459,135

(22) Filed: Apr. 28, 2012

(65) Prior Publication Data
US 2012/0311112 A1    Dec. 6, 2012

Related U.S. Application Data (63) Continuation of application No. 13/151,079, filed on Jun. 1, 2011.

(51) Int. Cl.
G06F 9/445 (2006.01)
G06F 15/78 (2006.01)
G06F 9/44 (2006.01)

(52) U.S. Cl.
CPC ............ *G06F 8/665* (2013.01); *G06F 15/7871* (2013.01); *G06F 9/4418* (2013.01); *G06F 15/7892* (2013.01)

USPC .......................................................... 709/221

(58) Field of Classification Search
CPC ........................ H04L 29/08837; H04L 49/901
USPC .......................................................... 709/221
See application file for complete search history.

(56) References Cited

U.S. PATENT DOCUMENTS

| 5,805,816 | A | 9/1998 | Picazo et al. |
| 5,844,422 | A | 12/1998 | Trimberger et al. |

(Continued)

FOREIGN PATENT DOCUMENTS

| CN | 1488105 A | 4/2004 |
| CN | 1598798 A | 3/2005 |

(Continued)

OTHER PUBLICATIONS

Landaker, Wesley J. "Using Hardware Context-Switching to Enable a Multitasking Reconfigurable System." Brigham Young University: Aug. 2002. 76 pages.*

(Continued)

*Primary Examiner* — Jeffrey R Swearingen
*Assistant Examiner* — Benjamin Jenkins
(74) *Attorney, Agent, or Firm* — Steven Chiu, Esq.; Kevin P. Radigan, Esq.; Heslin Rothenberg Farley & Mesiti P.C.

(57) ABSTRACT

Programmable hardware devices are re-programmed without system downtime. To re-program the device, the device is quiesced, state associated with the device is saved, updates are loaded, the state is restored and operations are resumed, all transparent to the system, except for a possible delay in the system.

11 Claims, 7 Drawing Sheets

(56) References Cited

U.S. PATENT DOCUMENTS

| | | | |
|---|---|---|---|
| 6,078,736 | A | 6/2000 | Guccione |
| 6,122,679 | A | 9/2000 | Wunderlich |
| 6,226,704 | B1 | 5/2001 | Wang et al. |
| 6,243,781 | B1 | 6/2001 | Gandhi et al. |
| 6,292,910 | B1 | 9/2001 | Cummins |
| 6,314,477 | B1 | 11/2001 | Cowger et al. |
| 6,507,211 | B1 | 1/2003 | Schultz et al. |
| 6,557,101 | B1 | 4/2003 | MacDonald et al. |
| 6,636,919 | B1 * | 10/2003 | Huth ............................. 710/304 |
| 6,735,174 | B1 | 5/2004 | Hefty et al. |
| 6,757,768 | B1 | 6/2004 | Potter et al. |
| 6,832,279 | B1 | 12/2004 | Potter et al. |
| 6,867,614 | B1 | 3/2005 | LeGraverand et al. |
| 6,937,063 | B1 | 8/2005 | Sun et al. |
| 7,096,398 | B1 | 8/2006 | Mukherjee |
| 7,124,230 | B2 | 10/2006 | Smith et al. |
| 7,210,000 | B2 | 4/2007 | Creta et al. |
| 7,231,560 | B2 | 6/2007 | Lai et al. |
| 7,412,555 | B2 | 8/2008 | Wang |
| 7,412,589 | B2 | 8/2008 | Feiste |
| 7,437,643 | B2 | 10/2008 | Khanna et al. |
| 7,443,869 | B2 | 10/2008 | Solomon et al. |
| 7,444,500 | B1 | 10/2008 | Jones |
| 7,463,056 | B1 | 12/2008 | Anderson et al. |
| 7,478,189 | B2 | 1/2009 | Reed |
| 7,482,835 | B1 | 1/2009 | Sun et al. |
| 7,519,865 | B1 | 4/2009 | Maly et al. |
| 7,581,044 | B1 | 8/2009 | Davis |
| 7,616,508 | B1 | 11/2009 | Landry et al. |
| 7,675,929 | B1 | 3/2010 | Davis |
| 7,676,611 | B2 | 3/2010 | Hui et al. |
| 7,685,380 | B1 | 3/2010 | Khu |
| 7,747,809 | B2 | 6/2010 | Hanscom |
| 7,782,760 | B2 | 8/2010 | Froroth et al. |
| 7,836,352 | B2 | 11/2010 | Sharma et al. |
| 7,853,774 | B1 | 12/2010 | Wentzlaff |
| 7,882,296 | B2 | 2/2011 | Reed |
| 7,885,122 | B2 | 2/2011 | Landry et al. |
| 7,996,572 | B2 | 8/2011 | Blankenship et al. |
| 8,078,786 | B2 | 12/2011 | Hong et al. |
| 8,085,800 | B2 | 12/2011 | Naven et al. |
| 8,400,915 | B1 | 3/2013 | Brown et al. |
| 2004/0076116 | A1 | 4/2004 | Hefty et al. |
| 2005/0015520 | A1 | 1/2005 | Berg et al. |
| 2005/0091383 | A1 | 4/2005 | Bender et al. |
| 2005/0273400 | A1 | 12/2005 | Blankenship et al. |
| 2007/0083681 | A1 * | 4/2007 | Bartley et al. .................. 710/22 |
| 2007/0233821 | A1 | 10/2007 | Sullivan et al. |
| 2008/0163005 | A1 | 7/2008 | Sonksen et al. |
| 2009/0292960 | A1 | 11/2009 | Haraden et al. |
| 2010/0083040 | A1 | 4/2010 | Voigt et al. |
| 2010/0251055 | A1 | 9/2010 | Murakami et al. |
| 2010/0318716 | A1 | 12/2010 | Nguyen |
| 2010/0325495 | A1 | 12/2010 | Talla et al. |
| 2011/0029706 | A1 | 2/2011 | Bekooij et al. |
| 2012/0011283 | A1 | 1/2012 | Freking et al. |
| 2013/0013877 | A1 | 1/2013 | Tian |

FOREIGN PATENT DOCUMENTS

| | | |
|---|---|---|
| CN | 1768333 A | 5/2006 |
| EP | 0947049 A1 | 10/1999 |
| EP | 1892836 A1 | 2/2008 |
| JP | 2002246538 A | 8/2002 |
| JP | 2006178826 A | 7/2006 |

OTHER PUBLICATIONS

Office Action for U.S. Appl. No. 13/151,079 dated Feb. 19, 2013.

"IEEE 100: The Authoritative Dictionary of IEEE Standards Terms," (IEEE Std 100-2000) Seventh Ed. IEEE: 2000.doi: 10.1009/IEEESTD.2000.322234 URL: http://ieeexplore.ieee.org/stamp/stamp.jsp?tp=&arnumber=4116792&isnumber=4116786) D'section. pp. 266-348

Pricer et al., "Computers, Software Engineering, and Digital Devices," Richard C. Dorf, Ed. CRC Press: 2005, Chapter 2: Memory Devices, pp. 1-31.

"aspect" Collins English Dictionary. HarperCollins Publishers: 2000. Retrieved from http://www.credoreference.com/entry/hcengdict/aspect, p. 1.

Kai et al., "A Study of Lossless Reconfiguration on Packet Processing System," NTT Network Service Systems Laboratories, B-6-150, Sep. 2003, pp. 1-7, English Translation.

Griese et al., "A Reconfigurable Ethernet Switch for Self-Optimizing Communication Systems," 2006, in IFIP International Federation for Information Processing, vol. 216, Biologically Inspired Cooperative Computing, eds. Pan, Y, Rammig, E, Schmeck, H., Solar, M., (Boston, Springer), pp. 115-124.

Bender et al., "Avoiding Non-Posted Request Deadlocks in Devices," U.S. Appl. No. 13/151,073, filed Jun. 1, 2011.

Bender et al., "Avoiding Non-Posted Request Deadlocks in Devices," U.S. Appl. No. 13/452,017, filed Apr. 20, 2012.

Bender et al., "Re-Programming Programmable Hardware Devices Without System Downtime," U.S. Appl. No. 13/151,079, filed Jun. 1, 2011.

Office Action for U.S. Appl. No. 13/151,073 dated Aug. 29, 2012.

Office Action for U.S. Appl. No. 13/452,017 dated Aug. 29, 2012.

International Search Report and Written Opinion for PCT/IB2012/052295 dated Sep. 13, 2012.

International Search Report and Written Opinion for PCT/IB2012/052299 dated Sep. 13, 2012.

Final Office Action for U.S. Appl. No. 13/151,079 dated Aug. 15, 2013, pp. 1-18.

Chencinski, E.W. et al., "IBM System z10 I/O Subsystem," IBM J. Res. & Dev., vol. 53, No. 1, p. 6, Jan. 2009, pp. 6:1-6:13.

Blank, Annika et al., "Advanced Power Virtualization on IBM System p5," IBM.com/redbooks, Oct. 2005, pp. 1-452.

Mitchell, Jim et al., "IBM Power5 Process-based Servers: A Highly Available Design for Business-Critical Applications," Oct. 2005, pp. 1-44.

Patel, Bindesh et al., "Transaction-based Debug of PCI Express Embedded SoC Platforms," CompactPCI and AdvancedTCA Systems, Dec. 2004, pp. 1-4.

Paz-Vincente, R. et al., "Time-Recovering PCI-AER Interface for Bio-Inspired Spiking Systems," Proceedings of the SPIE—The International Society for Optical Engineering, vol. 5839, No. 1, pp. 111-118, May 2005 (Abstract Only).

"z/Architecture—Principles of Operation," SA22-7832-08, Ninth Edition, Aug. 2010, pp. 1-1496.

Bender et al., Office Action for U.S. Appl. No. 13/151,079, filed Jun. 1, 2011 (U.S. Patent Publication No. 2012/0311110 Al), dated Feb. 4, 2014 (28 pages).

"IEEE 100: The Authorative Dictionary of IEEE Standards Terms", 'R' Section, IEEE Std. 100-200, Seventh Ed., IEEE: 2000 (92 pages).

Landaker, Wesley J., "Using Hardware Context-Switching to Enable a Multitasking Reconfigurable System", Brigham Young University, Aug. 2002 (76 pages).

Jann et al., "Dynamic Reconfiguration: Basic Building Blocks for Autonomic Computing on IBM pSeries Servers", IBM Systems Journal, vol. 42, No. 1, pp. 29-37, 2003 (9 pages).

* cited by examiner

RE-PROGRAMMING PROGRAMMABLE HARDWARE DEVICES WITHOUT SYSTEM DOWNTIME

This application is a continuation of Ser. No. 13/151,079, entitled "RE-PROGRAMMING PROGRAMMABLE HARDWARE DEVICES WITHOUT SYSTEM DOWNTIME," filed on Jun. 1, 2011, which is hereby incorporated herein by reference in its entirety.

BACKGROUND

One or more aspects of the invention relate, in general, to programmable hardware devices, and in particular, to re-programming such devices.

An example of a programmable hardware device is a field programmable gate array (FPGA). A field programmable gate array is an integrated circuit designed to be configured after manufacturing. The FPGA configuration is generally specified using a hardware description language (HDL), similar to that used for an application-specific integrated circuit (ASIC). FPGAs can be used to implement any logical function that an ASIC could perform. They contain programmable logic components (i.e., logic blocks) and a hierarchy of reconfigurable interconnects that allow the blocks to be connected to one another in various configurations.

BRIEF SUMMARY

Shortcomings of the prior art are overcome and additional advantages are provided through the provision of a method of re-programming hardware devices. The method includes, for instance, quiescing one or more entities associated with a programmable hardware device to be re-programmed; storing state associated with the programmable hardware device in one or more locations external to the programmable hardware device; reloading the programmable hardware device, the reloading including providing an update to the programmable hardware device; and restoring state associated with the programmable hardware device using the stored state, wherein the programmable hardware device is re-programmed absent system downtime.

Computer program products and systems relating to one or more aspects of the present invention are also described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided for re-programming programmable hardware devices without system downtime. That is, components external, but coupled to, the device being re-programmed are not affected except for possibly a delay. Those components do not need to be brought down, restarted or otherwise take action for the re-programming. The re-programming is transparent to those components, except that performance may be impacted by a delay. For instance, if one or more logic blocks of a router are to be re-programmed, the re-programming occurs without affecting the adapter(s) or host(s) coupled to the router, except that the adapter(s) or host(s) may notice a slowdown in processing.

The programmable hardware devices being re-programmed are, for instance, field programmable gate arrays that can be included in many communications or computing components, systems, environments, etc. In the particular example described herein, one or more field programmable gate arrays of a router are being re-programmed. However, field programmable gate arrays or other programmable hardware devices in components, systems, environments etc. other than routers may be re-programmed using one or more aspects of the present invention.

One embodiment of a communications environment that may include programmable hardware devices to be re-programmed is described with reference to FIG. 1. In one example, a communications environment 100 includes a System z® server offered by International Business Machines Corporation. System z® is based on the z/Architecture® offered by International Business Machines Corporation.

Details regarding the z/Architecture® are described in an IBM® publication entitled "z/Architecture-Principles of Operation," IBM publication No. SA22-7832-08, Ninth Edition, August 2010, which is hereby incorporated herein by reference in its entirety. IBM®, System z®, and z/Architecture® are registered trademarks of International Business Machines Corporation, Armonk, N.Y. Other names used herein may be registered trademarks, trademarks or product names of International Business Machines Corporation or other companies.

In one example, communications environment 100 includes a router 102 coupled to a network adapter 104 and a host 106. The network adapter is based, for instance, on the Peripheral Component Interconnect Express (PCIe) technology, specifications of which are maintained by the PCI Special Interest Group (PCI SIG). The host may comprise one or more virtual machines 107, and therefore, router 102 may be referred to as a virtualization router. In other embodiments, however, the host does not comprise virtual machines.

In one example, router 102 includes a receive buffer 108, which receives data from network adapter 104. The data is received in the form of one or more packets. Coupled to the receive buffer is a parser 110, which examines each packet's header (e.g., layer 2, layer 3, etc.), and performs a test to determine whether a destination connection can be determined for the received packet. If so, processing determines whether one or more connection-specific resources required to send the packet to, for example, virtual host memory 109 corresponding to the destination connection are available. The one or more connection-specific resources are available if they can be obtained for allocation by a resource allocation mechanism, such as an allocator 112. For example, allocator 112 attempts to obtain one or more connection-specific resources required to send the packet to virtual machine 107 that corresponds to the destination connection. (Virtual machine and virtual host are used interchangeably herein.)

Figure 1:
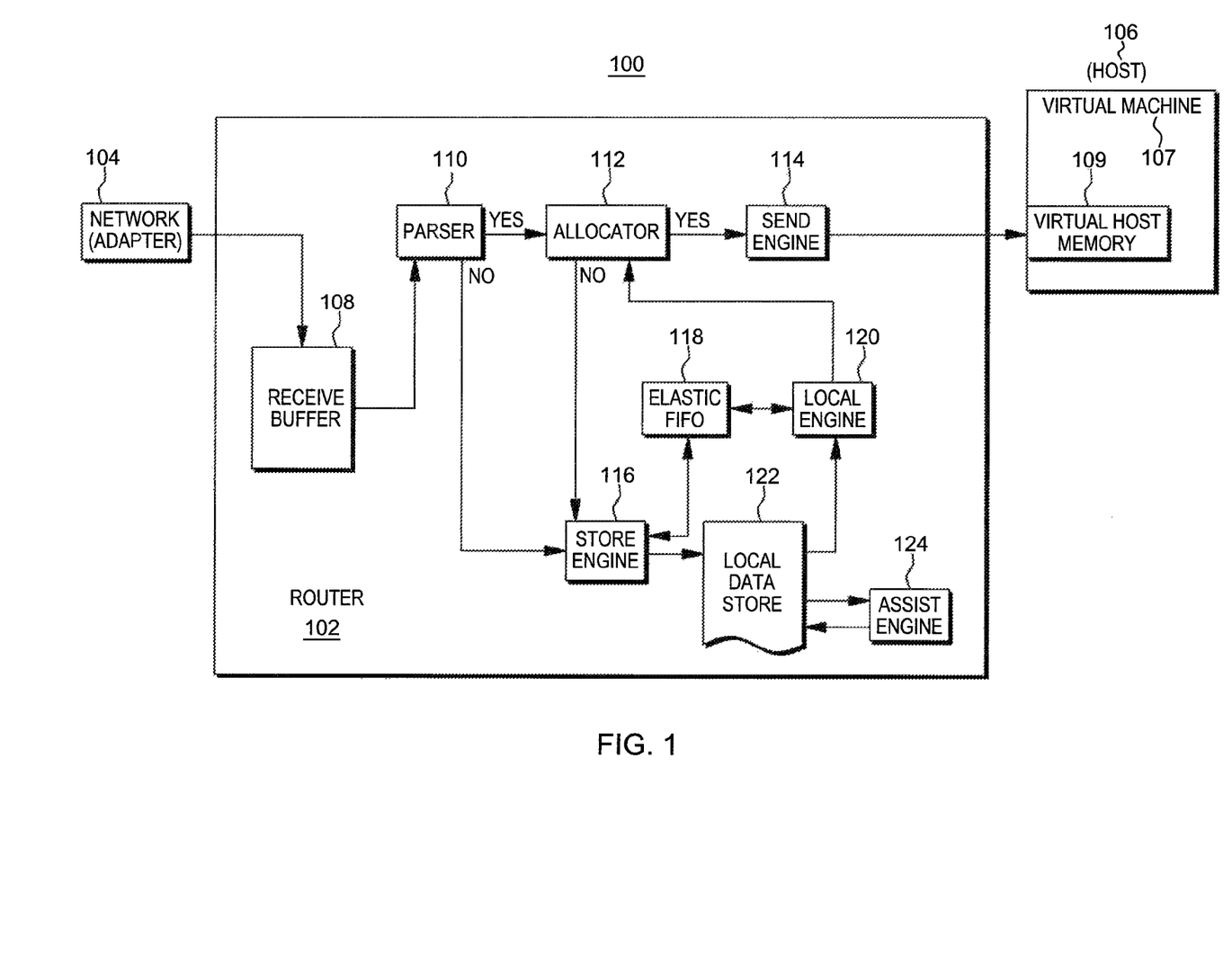
FIG. 1 depicts one embodiment of a communications environment to incorporate and use one or more aspects of the present invention.

Although the example of FIG. 1 depicts one virtual machine 107, this is for purposes of illustration only. The system may include a plurality of virtual machines. For example, a system may include hundreds or thousands of virtual machines. With hundreds or thousands of virtual machines running on a single physical host, there may be scattered shortages of resources for some small subset of the virtual machines at any given time. Within the physical machine, a hypervisor may allocate different resources to different virtual machines. For example, some virtual machines may have higher priority, and therefore, get more time-slices than others. On the other hand, some virtual machines may have more physical storage allocated for use as receive buffers.

In one example, a local engine 120 blocks allocator 112 from allocating resources to new packets when packets for the same connection already exist within an elastic First In, First Out (FIFO) memory 118 because of a previous lack of resources. If allocator 112 is successful in obtaining the resources, a send engine 114 writes the packet to virtual host memory 109 associated with virtual machine 107. If parser 110 does not determine the packet's destination connection, it passes the packet to a store engine 116. If allocator 112 fails in its attempt to attain the required resources, which could be because the resources are unavailable or because the local engine currently has priority access to those resources, allocator 112 passes the packet to store engine 116.

For each packet it is to service, store engine 116 obtains a free packet buffer from elastic FIFO 118. A free packet buffer is an empty packet-sized block of memory in a local data store (LDS) 122. Store engine 116 moves the packet into that buffer and submits the used buffer to elastic FIFO 118. If a free packet buffer resource is not available, the packet is dropped or, optionally, store engine 116 can wait for that shared resource to become available provided sufficient buffering, such as the receive buffer, is available. Since a packet's connection is to be determined before it can be sent to virtual host memory 109, assist engine 124 determines and assigns connections to packets that were submitted to elastic FIFO 118 without known connections (i.e., those packets which arrived from parser 110).

Local engine 120 continuously, periodically or repeatedly monitors both allocator 112 for connection-specific resources and elastic FIFO 118 for the presence of packets with known destination connections. When resources become available for a connection which had previously lacked resources, local engine 120 gains exclusive access to those resources, via allocator 112, until no more packets for that connection exist in elastic FIFO 118. When a connection with both waiting packets and available resources is seen, the packet is removed from local data store 122 and passed to allocator 112. Allocator 112 allocates the connection-specific resources required to send that packet to virtual machine 107 corresponding to the connection destination. Since local engine 120 already determined that the resources were available and claimed them for the packet, allocator 112 is successful and the packet is written to virtual host memory 109 by send engine 114.

Figure 2:
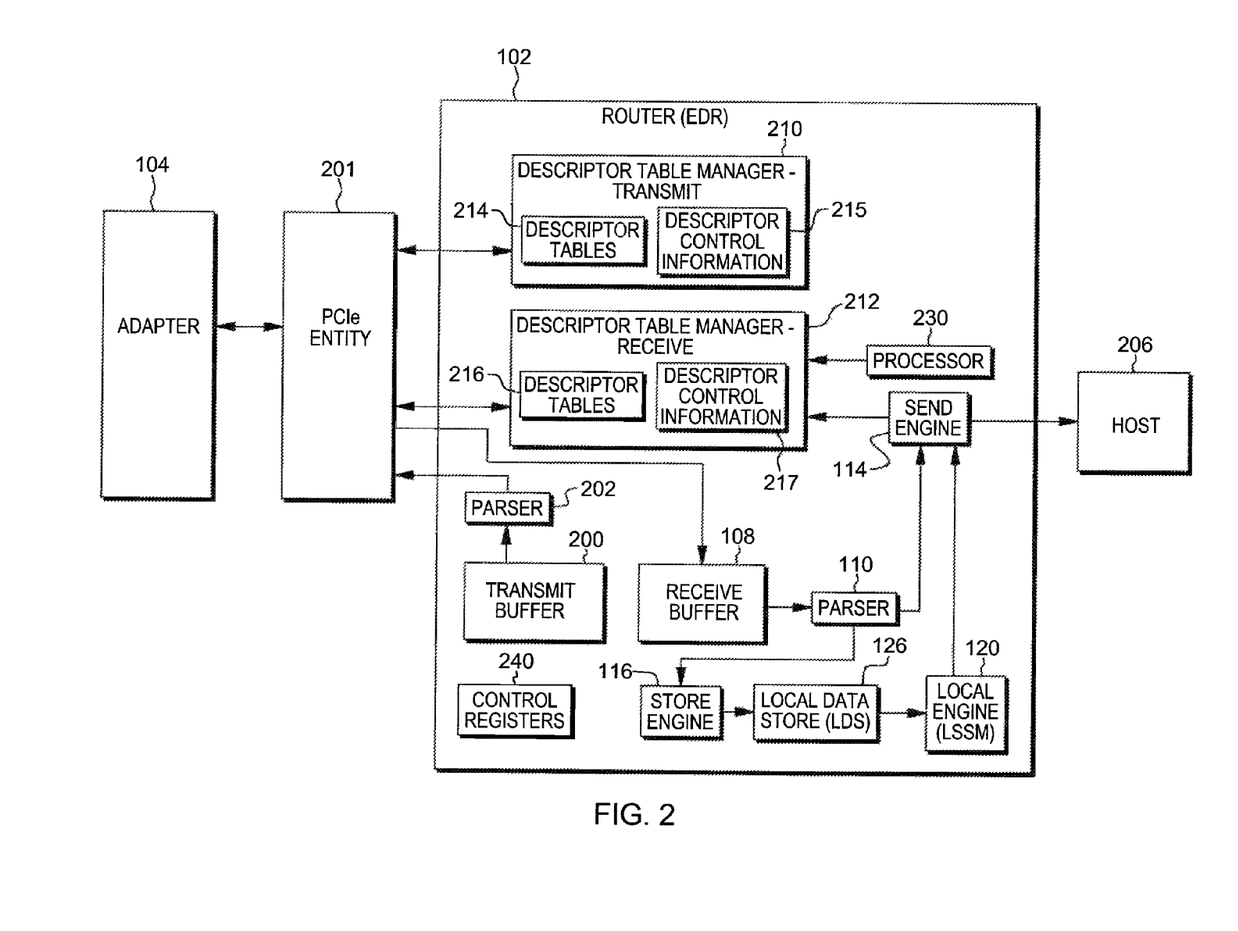
FIG. 2 depicts further details of the communications environment of FIG. 1, in accordance with an aspect of the present invention.

In addition to the receive buffer and the elements described above, router 102 also includes a transmit buffer, as well as other elements used in accordance with an aspect of the present invention. Referring to FIG. 2, a transmit buffer 200 transmits packets from router 102 to adapter 104 via a parser 202. In this particular example, parser 202, as well as receive buffer 108, communicate with the adapter via an interface referred to as PCIe entity 201.

Further coupled to PCIe entity 201 are a descriptor table manager (DTM) for a transmit path (DTM-TX) 210 and a descriptor table manager (DTM) for a receive path (DTM-RX) 212 located within router 102. Each of these descriptor table managers includes one or more descriptor tables 214, 216, respectively. For instance, there may be one transmit and receive descriptor table for each port of the adapter. Each descriptor table includes one or more descriptors that describe a packet being transferred (e.g., packet size, address). Some descriptor tables include commands that are given to the adapter to tell the adapter where to store the packets and the status of the packets.

Additionally, each descriptor table manager includes descriptor control information 215, 217, respectively, that is associated with the descriptors, and includes, for instance, packet ids, tracking buffers (including control information for the descriptor tables) and/or information used to check the packet ids, etc. The packet ids included in descriptor table 214 are for packets to be transmitted to the adapter; and the packet ids included in descriptor table 216 are for packets that are received by the adapter.

Additionally, router 102 includes a processor 230 and a set of control registers 240 used during operation of the router. In accordance with an aspect of the present invention, control registers 240 include a number of indicators to be set/reset during the re-programming of the programmable hardware device, as described in detail below. The control registers are connected to the various components within the router that use the indicators, and the indicators are set/reset by processor 230. Router 102 (i.e., the logic blocks of the router) may be implemented via programmable hardware devices and/or application-specific integrated circuits. In this particular example, some of the logic blocks of router 102 are implemented via programmable hardware devices, such as field programmable gate arrays (FPGA), while other logic blocks are implemented via application-specific integrated circuits (ASIC).

Figure 3:
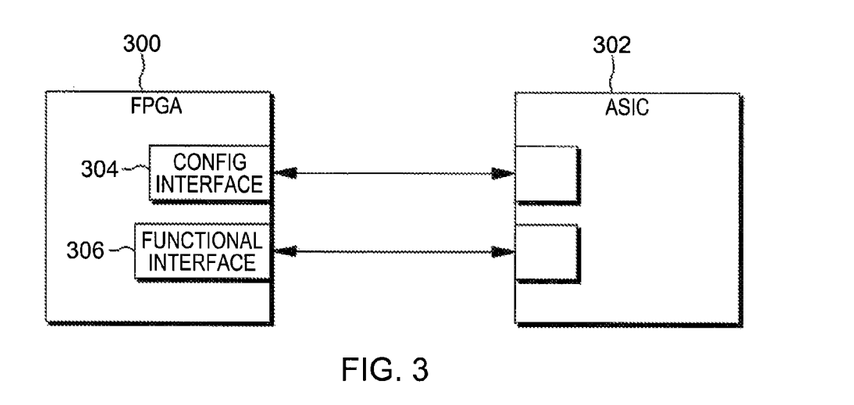
FIG. 3 depicts an example of a field programmable gate array device and an application-specific integrated circuit that may be used to implement a component of the communications environment of FIG. 1 and interfaces between them, in accordance with an aspect of the present invention.

The FPGA devices and the application-specific integrated circuits are coupled to one another via one or more interfaces, as shown in FIG. 3. For instance, an FPGA device 300 is coupled to an ASIC 302 via a configuration interface 304 and a functional interface 306. The configuration interface is used in the configuration of the FPGA, and the functional interface is used during processing that involves the FPGA.

At times, it is desirable to perform an update on an FPGA device to provide additional functionality, to correct a problem, or to otherwise make some updates. Thus, in accordance with an aspect of the present invention, a capability is provided for updating the FPGA device without system downtime. This means that the update is performed concurrently, such that an IML (Initial Machine Load) is not required to apply the updates and the updates are applied transparently to the system (e.g., hosts) and to the network components coupled to the device (e.g., network adapters). The operating systems are unaware of the updates, no manual intervention is required (no vary off/on), and the network does not see any state changes. There is no effect on the system (e.g., hosts and adapters) except possibly a performance delay while the re-programming is taking place.

One embodiment of an overview of the logic to re-program a programmable hardware device without system downtime is described with reference to FIG. 4. In this embodiment, it is processor 230 that is performing the tasks to re-program the programmable hardware device. In particular, it is firmware of the processor performing the tasks. Firmware, as used herein, includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. In this example, the processor is considered a part of router 102; however, in other embodiments, the processor may be external, but coupled to, router 102. Further, in other embodiments, processor code other than firmware may perform one or more of the tasks.

Figure 4:
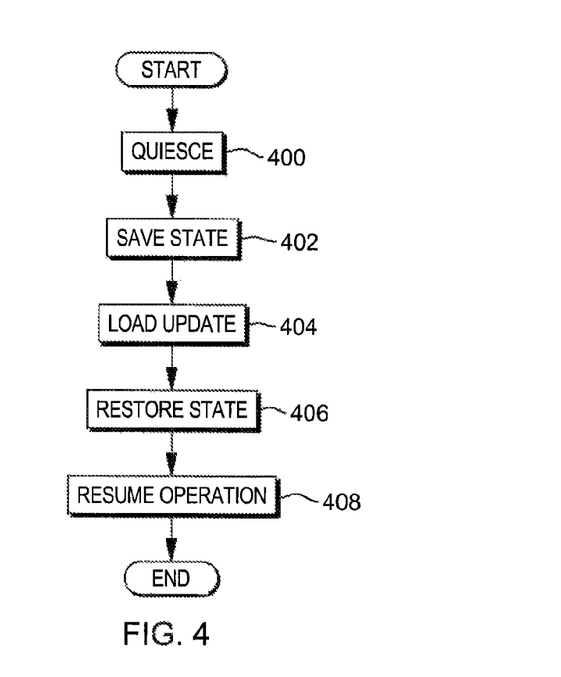
FIG. 4 depicts one embodiment of an overview of the logic to re-program a programmable hardware device, in accordance with an aspect of the present invention.

Referring to FIG. 4, the programmable hardware device is quiesced, STEP 400, and then state of the device, such as static state, is saved, STEP 402. That is, one or more entities associated with the programmable hardware device are quiesced, and then, state associated with the device is saved. The update is then loaded on the device, STEP 404, and the saved state is restored, STEP 406. Operation of the device then resumes, STEP 408. This all occurs without system downtime; i.e., concurrent and transparent to the system, such as to the one or more hosts and network adapters.

Further details of each of these tasks are described with reference to FIGS. 5A-7B. These details are provided for a specific example of an FPGA device of a router being re-programmed. However, one or more aspects of the invention are applicable to FPGA or other programmable hardware devices of other components.

Figure 5A:
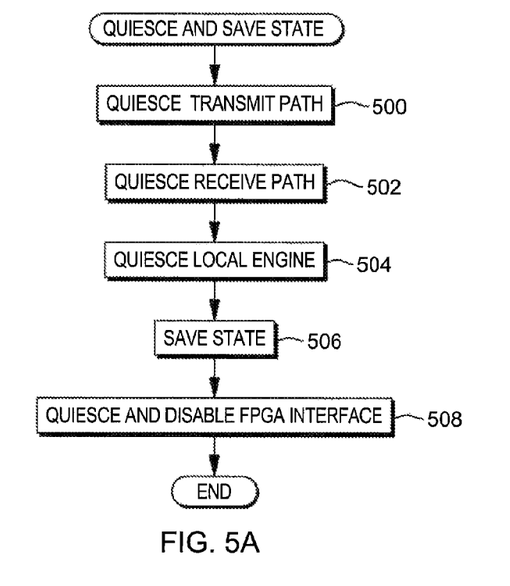
FIG. 5A depicts one embodiment of the logic to quiesce entities and save state associated with the programmable hardware device being re-programmed, in accordance with an aspect of the present invention.

Referring initially to FIG. 5A, details relating to quiescing the device and saving its state are described. In one example, since the device being re-programmed is in the router, the transmit path from the router (e.g., the transmit buffer and parser) are quiesced to stop the router from starting any new work and to allow the work in process to complete, STEP 500.

This is accomplished by, for instance, setting an indicator associated with the transmit path to a defined value (e.g., zero). This indicator is located within control registers 240, in this example. Further, in one example, the descriptor tables and descriptor control information in the descriptor table manager for the transmit path are saved by, for instance, copying them to local data store.

In addition to quiescing the transmit path, the receive path of the router (e.g., the receive buffer and parser) is quiesced to stop the network adapter from presenting new work to the router enabling the router to finish any work in progress, STEP 502. The receive path is quiesced instead of reset, since a reset would be considered a loss of the link and the link is to be considered available to be able to capture data (such as returned descriptors, described below) until the router is back online. Further details regarding quiescing the receive path are described further below with reference to FIG. 5B.

Continuing with FIG. 5A, local engine 120 is also quiesced, STEP 504. Again, this is accomplished by setting an indicator corresponding to the local engine in the control registers to indicate the local engine is quiesced. Subsequent to quiescing the local engine, as well as the transmit path and receive path, certain state associated with the programmable hardware device is saved, STEP 506. This state is referred to herein as static state, and includes, for instance, the control registers, configuration data, routing tables, look-up tables, descriptor control information for the receive path and possibly other state, but not the receive path descriptor tables themselves. The state that is saved is model-dependent and further it depends on the programmable hardware device being re-programmed.

Additionally, functional interface 306 between the FPGA and ASIC is quiesced and disabled, again by setting the appropriate indicators, STEP 508.

Figure 5B:
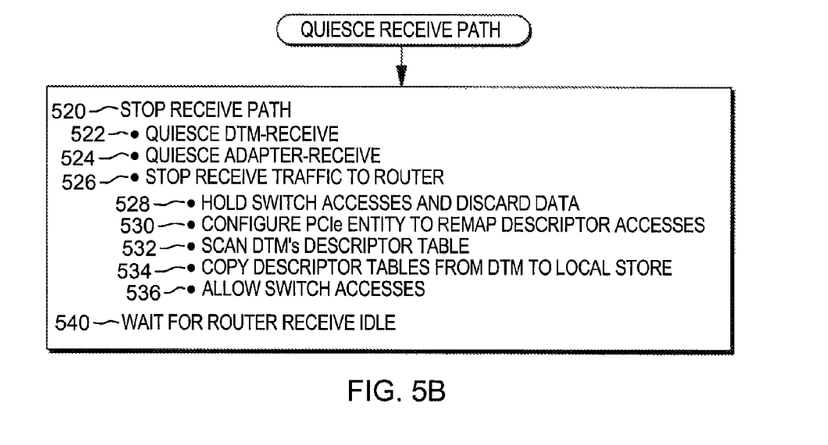
FIG. 5B depicts one embodiment of the logic to quiesce a receive path associated with the programmable hardware device being re-programmed, in accordance with an aspect of the present invention.

Further details regarding quiescing the receive path are described with reference to FIG. 5B. Initially, the receive path is stopped, STEP 520. This includes performing a number of tasks, as described herein, commencing with quiescing the descriptor table manager for the receive path (DTM-RX) by turning off the DTM-RX enable included in control registers 240, STEP 522. This causes the descriptor table manager for the receive path to stop giving the receive path descriptors back to the adapter, when processing of the packets are complete. It does, however, continue to process descriptor returns from the adapter and to the send engine. On an active network, the receive path quiesces by itself. However, on a less active network, the adapter may continue to hold onto some descriptors.

Stopping the receive path also includes quiescing the adapter receive path, STEP 524, if the adapter supports this function. This is the next cleanest way to stop receive traffic, but not all adapters support this function. If it is supported, then an indicator corresponding to this function is set in the control registers.

Further, to stop the receive path, the receive traffic to the router is stopped, STEP 526. This ensures that no other accesses will be made to the router. In one example, this is only performed if the network is relatively idle and there is no other way to stop the adapter itself. In one example, to stop the receive traffic, STEPS 528-536 are performed, each of which is described below.

Initially, the PCIe entity is set to hold accesses to the descriptor table manager for the receive path and to discard data for the router data receive path, STEP 528. Thus, in control registers 240 an indicator is set to turn off the path from the PCIe entity to the descriptor table manager on the receive path and another indicator is set to turn off the path from the PCIe entity to the receive buffer.

Additionally, the PCIe entity is configured to remap the accesses (that were to go to the descriptor table manager for the receive path) to the local data store, STEP 530. The remapping translates addresses, provided by the adapter to place the accesses in the descriptor table, to different addresses that point to the local data store.

Thereafter, one or more descriptor tables in the descriptor table manager for the receive side are scanned looking for descriptors which are "not done" (i.e., still in process), STEP 532. If there is a descriptor that is not done, the packet id is obtained from the descriptor control information, and if this packet is shown in the control registers to be in-flight in the receive side of the adapter (e.g., the receive buffers), then the copy of the descriptor table in local data store will be marked "done with error", so that the router can complete processing of the packet. The router will then release the packet id back to the descriptor table manager for the receive path.

Moreover, the current descriptor tables are copied from the descriptor table manager for the receive path to the local data store, STEP 534. A standard processor serializing instruction (e.g., MSYNC) is issued to ensure the write has completed.

The PCIe entity is then set to allow router accesses (e.g., PCI switch accesses) once again, but continues to discard router data receive path traffic, STEP 536.

Responsive to performing the tasks to stop the receive path, the processor waits for the router to transition into an idle state for the receive path, STEP 540.

Figure 6:
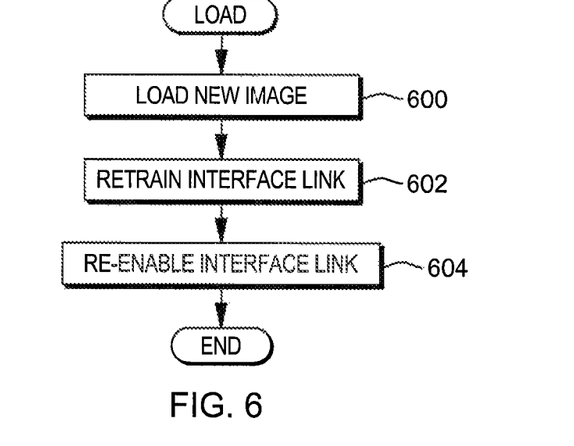
FIG. 6 depicts one embodiment of the logic to load an update for the programmable hardware device being re-programmed, in accordance with an aspect of the present invention.

Subsequent to quiescing and saving the state, the programmable hardware device is loaded with the update. Referring to FIG. 6, the new image is loaded into the programmable hardware device using configuration interface 304 of the device, STEP 600. The data representing the new image is transferred over the bus to the configuration interface of the programmable hardware device.

Then, the link to the functional interface of the programmable hardware device is re-trained, STEP 602, and re-enabled, STEP 604. To re-train the link, measurements are taken and compared to a clock signal to determine specific timings to be used for the link. The re-enablement includes resetting the appropriate indicator in the control registers.

Figure 7A:
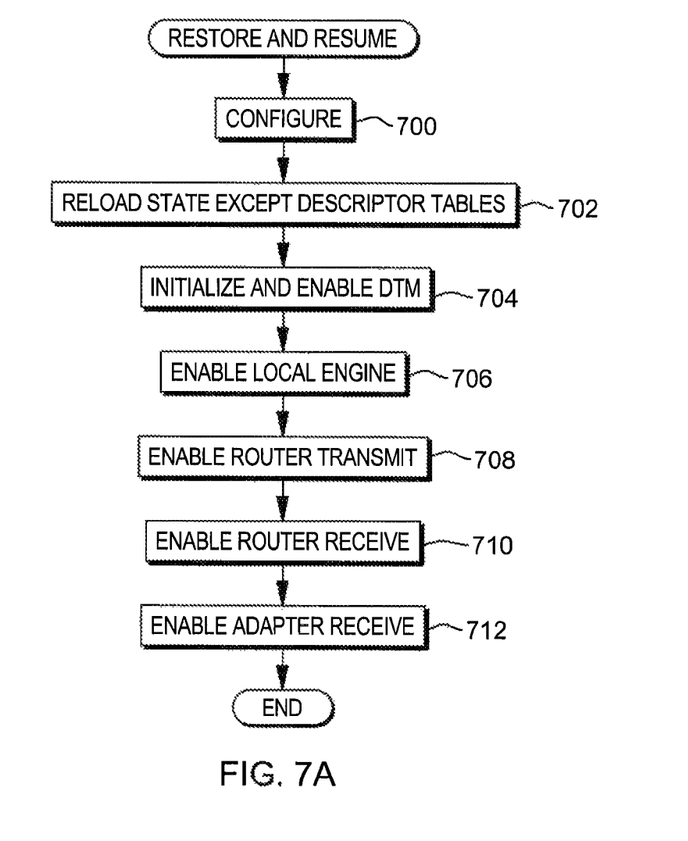
FIG. 7A depicts one embodiment of the logic to restore and resume operations associated with the programmable hardware device being re-programmed, in accordance with an aspect of the present invention.

Thereafter, the state is restored and operations are resumed, as described with reference to FIGS. 7A-7B. Referring to FIG. 7A, initially configuration is performed to bring the programmable hardware device back to where it was. For an FPGA device, this includes performing standard FPGA configuration (e.g., initialize the registers), STEP 700. This is similar to what is performed during standard power on/initialization of an FPGA device. Further, the control registers, configuration data, look-up tables, routing tables, and other information saved above, except for the descriptor tables and descriptor control information, are reloaded from the saved state, STEP 702. The descriptor tables and descriptor control information, for both the DTM-RX and DTM-TX, are exempt from this, since they are handled separately.

Additionally, the descriptor table managers for the receive path and the transmit path are initialized and enabled, STEP 704. Since the PCIe entity has been discarding router data receive path accesses during the concurrent update, the router has not been seeing any packet data arrive. However, descriptor returns were written to the local data store copy of the descriptor table. Firmware will examine the local data store copy of the descriptor table to find the descriptors that were returned by the adapter when the descriptor table manager for the receive path was offline. When the descriptor table manager is initialized, those packet ids for those descriptors are marked "available". Additional details regarding initializing and enabling the descriptor table managers are described further below with reference to FIG. 7B.

Continuing with FIG. 7A, in addition to initializing and enabling the descriptor table managers for the receive side and the transmit side, the local engine, router transmit path, router receive path, and the adapter receive path are enabled by resetting the appropriate indicators in the control registers, STEPS 706-712.

Figure 7B:
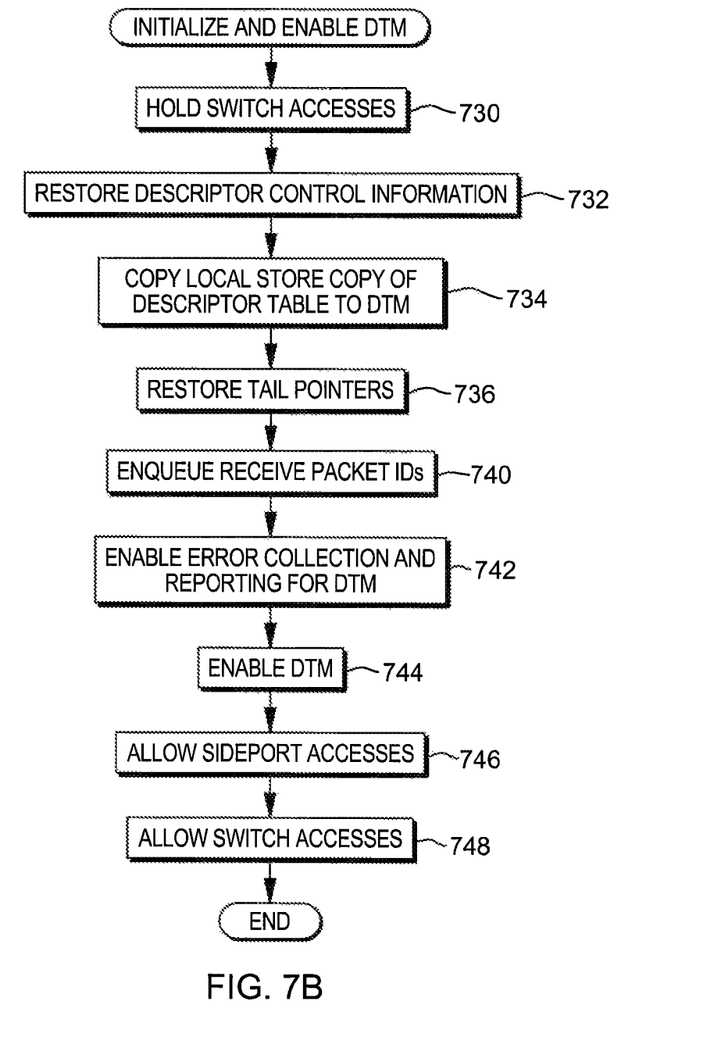
FIG. 7B depicts one embodiment of the logic to initialize and enable specific state associated with a particular programmable hardware device being re-programmed, in accordance with an aspect of the present invention.

Referring now to FIG. 7B, to initialize and enable the descriptor table manager for the receive path, a number of tasks are performed. For instance, the PCIe entity is set to hold the router accesses (e.g., PCI switch accesses), STEP 730. Additionally, the descriptor control information 217 associated with the descriptors (e.g., to confirm addresses or to otherwise manage the descriptors or descriptor tables) is restored by coping the saved state, STEP 732, and the current local data store copy of the descriptor table 216 is copied to the descriptor table manager, STEP 734. This includes the updates from the adapter while the descriptor table manager was offline.

Additionally, the tail pointers for each of the descriptor tables (e.g., each port's descriptor tables) is written/restored to point to the tail of the descriptor table in the descriptor table manager, STEP 736.

The receive packet ids are enqueued to a release FIFO located in the descriptor table manager for the receive path, which represents the packets that were returned while the descriptor table manager for the receive path was unavailable, STEP 740. For instance, the send engine, which is the control logic that manages the receive path, releases a packet id when it is finished with it. These are enqueued on the release FIFO.

Further, error collection and reporting for the descriptor table manager is enabled, if disabled, as well as the descriptor table manager itself, STEPS 742, 744.

The PCIe entity is set to allow receive buffer accesses and router accesses, STEPS 746, 748. This completes the initialization and enablement of the descriptor table manager for the receive path.

In addition to the above, the descriptor table manager for the transmit path is also initialized and enabled, including restoring the descriptor control information and descriptor tables for DTM-TX, enabling DTM-TX and allowing traffic to be sent to the adapter.

Described in detail above is a capability for re-programming a programmable hardware device, such as an FPGA device attached to an ASIC, without any need to disrupt the ASIC or system function. The programmable hardware device is first quiesced and then the state of the programmable hardware device is stored in, for instance, ASIC memory. Responsive to the programmable hardware device being reloaded, the state of the hardware programmable device is restored using the state in ASIC memory, and operations are resumed without any system downtime.

In one example, as the re-programming is occurring data packets continue to come into the router. Thus, during the re-programming, the data packets are redirected to the local data store of the router, instead of being sent to the send engine. After the re-programming, the data packets are forwarded from the data store to the send engine for sending to the host.

The programmable hardware device reconfigured in the example herein is within a router; however, one or more aspects of the present invention are equally applicable to programmable hardware devices in other components.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
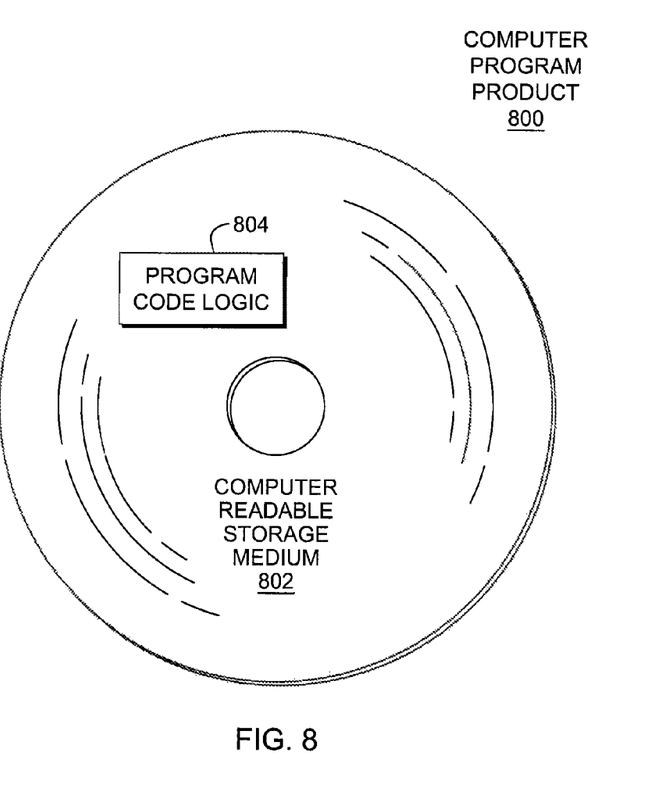
FIG. 8 depicts one embodiment of a computer program product incorporating one or more aspects of the present invention.

Referring now to FIG. 8, in one example, a computer program product 800 includes, for instance, one or more computer readable storage media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, communications environments of other architectures can incorporate and use one or more aspects of the present invention. Further, the environment may include more adapters, routers and/or hosts than described herein, and the adapter need not be based on PCIe. Additionally, the router may include more, fewer, and/or different elements than described herein. Moreover, other programmable hardware devices may be re-programmed using one or more aspects of the present invention. Further, the devices that are re-programmed need not be part of a router. As examples, any type of network device, switching device or any other device that transfers data between a source and a destination can be reprogrammed, in accordance with one or more aspects of the present invention. The technique to reprogram such devices includes, for instance, quiescing, saving state, loading an update, restoring state and resuming operation. It may also include redirecting traffic while performing the re-programming. Additionally, the state that is stored and restored may include different state than described herein and may depend on the device being re-programmed. Many other variations are possible without departing from a spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of re-programming programmable hardware devices, said method comprising:
   quiescing one or more entities internal to a programmable hardware device to be re-programmed, wherein the programmable hardware device is a router of a communications environment;
   storing state associated with the programmable hardware device in a resource internal to the programmable hardware device;
   reloading the programmable hardware device, the reloading including providing an update to the programmable hardware device; and
   restoring state associated with the programmable hardware device using the stored state, wherein the programmable hardware device is re-programmed absent bringing down or restarting components external but coupled to the programmable hardware device, the restoring comprising:

reloading stored state associated with the programmable hardware device from the resource internal to the programmable hardware device, except state that relates to one or more descriptor tables; and initializing and enabling at least one descriptor table manager of the router to restore state that relates to the one or more descriptor tables of the programmable hardware device.

2. The method of claim 1, wherein the resource internal to the programmable hardware device comprises memory implemented as an application-specific integrated chip.

3. The method of claim 1, wherein the quiescing further comprises quiescing a transmit path from the router to an adapter coupled to the router and a receive path of the router from the adapter.

4. The method of claim 3, wherein the quiescing the receive path of the router comprises stopping the receive path of the router and waiting for the router to be idle.

5. The method of claim 4, wherein stopping the receive path of the router comprises quiescing the at least one descriptor table manager for the receive path, and performing at least one of quiescing a receive path of the adapter or stopping traffic to the router.

6. The method of claim 5, wherein the stopping the receive path of the router comprises stopping traffic to the router, the stopping traffic comprising:

holding accesses to the router;
remapping descriptor accesses of the router to a data store;
scanning the one or more descriptor tables of the at least one descriptor table manager for the receive path for one or more descriptors that are not done and indicating in the data store that the one or more descriptors are not done; and
copying the one or more descriptor tables from the at least one descriptor table manager for the receive path to the data store.

7. The method of claim 1, wherein the providing an update to the programmable hardware device comprises:

performing configuration of the programmable hardware device.

8. The method of claim 7, wherein the initializing and enabling the at least one descriptor table manager to restore state that relates to the one or more of the descriptor tables further comprise:

holding accesses to the router;
restoring state that relates to the one or more descriptor tables;
copying a local data store copy of the one or more descriptor tables to the at least one descriptor table manager of the router;
restoring one or more pointers of the one or more descriptor tables;
enqueuing one or more packet ids to a queue of the router;
enabling the at least one descriptor table manager of the router;
allowing accesses to the router; and
enabling one or more paths associated with the router.

9. The method of claim 1, the initializing and enabling comprising:

holding accesses to the router;
restoring the one or more descriptor tables and controls associated therewith;
enabling the at least one descriptor table manager; and
allowing accesses to the router, based on enabling the at least one descriptor table manager.

10. The method of claim 1, wherein the providing an update to the programmable hardware comprises providing an update to a field programmable gate array of the router.

11. The method of claim 1, wherein the providing an update to the programmable hardware comprises providing an update to a field programmable gate array of the router, wherein the router is coupled to a host and a network adapter, the router including one or more field programmable gate arrays and application-specific integrated circuits, the application-specific integrated circuits being external to the one or more field programmable gate arrays.

* * * * *